Nov. 6, 1934.   R. R. BURNS   1,979,312
ORE DRYING APPARATUS
Filed Jan. 29, 1932   2 Sheets-Sheet 1
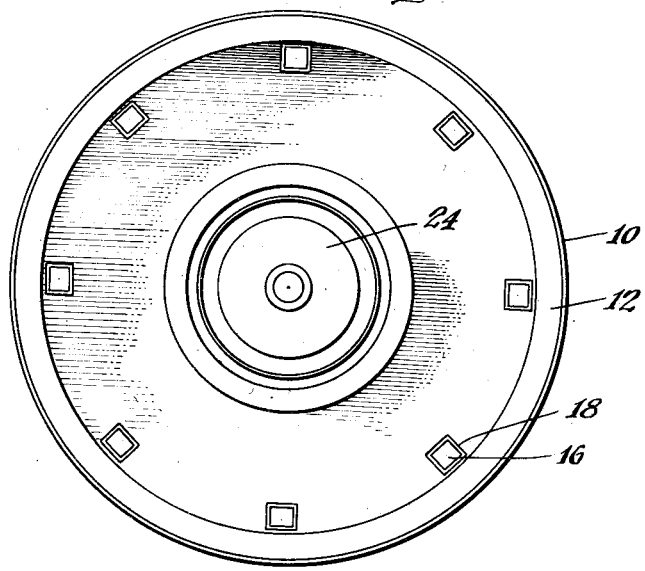
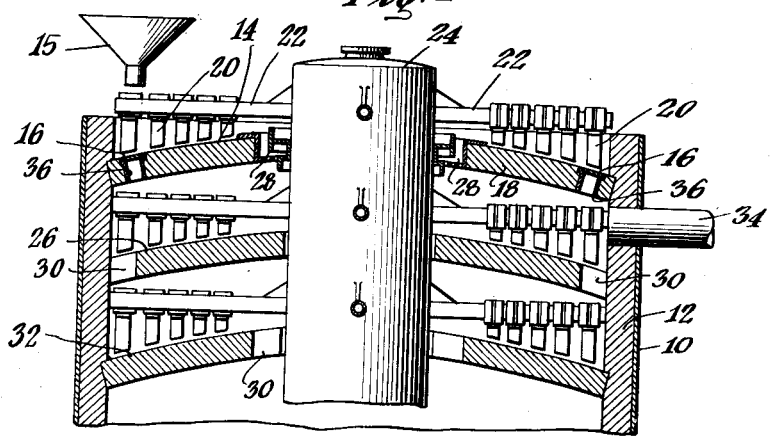
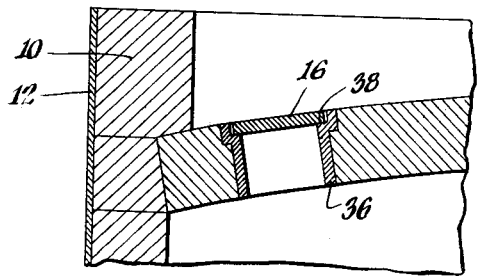
INVENTOR
Roy R. Burns
BY
Hoguet & Neary
ATTORNEYS Nov. 6, 1934.  R. R. BURNS  1,979,312
ORE DRYING APPARATUS
Filed Jan. 29, 1932     2 Sheets-Sheet 2

INVENTOR
Roy R. Burns
BY
Hoguet & Neary
ATTORNEYS

Patented Nov. 6, 1934

1,979,312

UNITED STATES PATENT OFFICE 1,979,312

ORE DRYING APPARATUS

Roy R. Burns, Copperhill, Tenn., assignor to Tennessee Copper Company, a corporation of New Jersey Application January 29, 1932, Serial No. 589,554

12 Claims. (Cl. 34—23)

My invention relates to ore drying carried out in conjunction with and as a preliminary to desulphurizing, calcining, chloridizing, and similar ore treatment operations, and involving the utilization in the drying operation of heat given off in the course of the reactions produced during the ore treatment operations.

While not limited in scope thereto, the invention is particularly concerned with roasting and drying operations carried out in multiple hearth furnaces, wherein a plurality of hearths are arranged one above the other and define therebetween communicating roasting or desulphurizing chambers, and the uppermost hearth constitutes an ore drying hearth to which heat is transmitted from the next adjacent roasting or desulphurizing chamber by conduction through the materials constituting the uppermost hearth. The invention also comprises certain improvements in furnace construction, as will be more fully described hereinafter.

An object of the invention is to provide a drying hearth which will permit of better control of the rate and degree of drying.

Other objects and advantages of the invention will be revealed as the description proceeds.

The invention in one of its broader aspects involves the idea of introducing the undried ore to a drying zone, wherein it is heated rapidly at a relatively high temperature until a substantial portion of the moisture is removed, and then, while still in said zone or after transfer therefrom to another drying zone, the ore is heated more slowly and at a lower temperature until drying is completed. By so doing, it is possible to increase materially the capacity of the dryer without causing any untoward reactions, such as roasting in the case of sulfide ores, to commence during the drying operation, as would be the case were it attempted to operate drying hearths heretofore employed at higher temperatures. The invention has the further advantage that through the increase in capacity of the drying hearth it is possible to feed the dried ore more rapidly to the roasting hearths thereby increasing their capacity. Since the heat developed in the roasting chambers varies with the rate of feed, it follows that the operating temperatures are increased with capacity and this in turn operates to increase the capacity of the drying hearth by supplying more heat thereto. It has also been found that the ore can be brought to a greater degree of dryness by following the teaching of the invention.

The principle of the invention may be applied to drying operations carried out in conjunction with multiple hearth furnaces of the general type hereinbefore mentioned by so constructing the drying hearth that the portions adjacent the point of feed of undried ore will permit heat to pass through more rapidly than through the portions more remote therefrom. This differential in the heat conductivity of the different portions of the hearth may be obtained in various ways, as, for example, by making the different portions of materials of differing heat conductivity or by varying the thickness of the hearth, or by both varying the thickness and using different materials.

For the purposes of illustration, I will now proceed to describe the invention as applied to and practiced in a furnace of the so-called Wedge or Herrshoff type, wherein a plurality of annular hearths are arranged one above the other and define therebetween communicating roasting or desulphurizing chambers, with the uppermost hearth constituting an ore drying hearth, and in which rabble arms connected to and moved by a centrally disposed shaft are positioned so as to stir the ore disposed on the several hearths and move it progressively across the surface of each hearth to an opening therein communicating with the next succeeding hearth in the series.

In the accompanying drawings:

Fig. 1 is a sectional elevation of sufficient of an ore roasting furnace to illustrate an embodiment of my invention wherein a differential in the rate of heat transfer through different adjacent portions of the drying hearth is effected by the insertion of a plurality of metal plates in an annular portion of the hearth adjacent the periphery;

Fig. 2 is a plan view of the drying hearth of Fig. 1;

Fig. 3 is a detail view showing one method of inserting the metal plates in the hearth;

Figure 5:
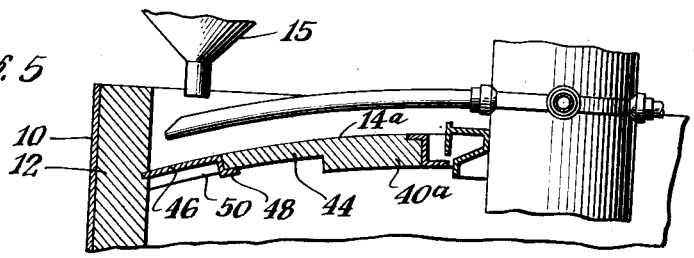
Figure 6:
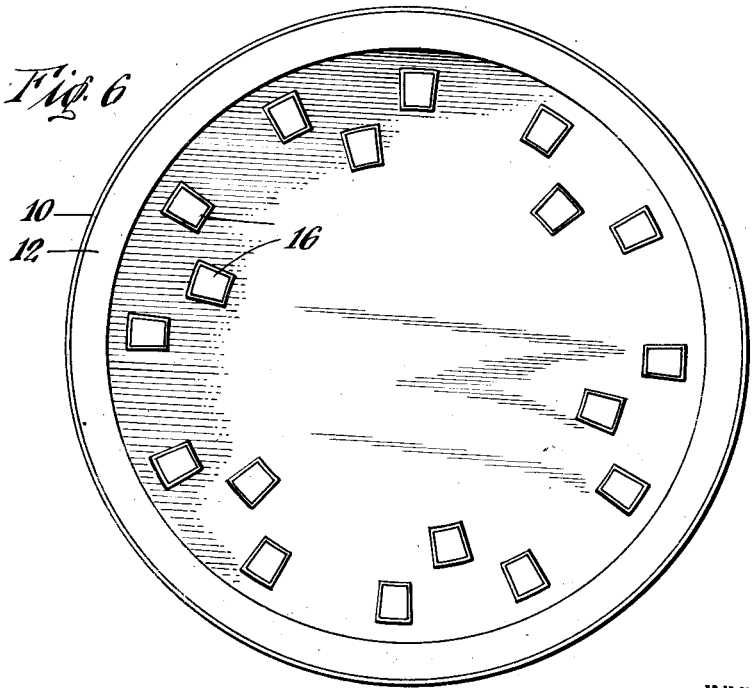

Fig. 5 is a part vertical section of still another modified form of drying hearth wherein a differential in the rate of heat transfer is effected by providing an outside annular portion of the hearth of metal, an intermediate portion of relatively thin refractory and an inner portion of thicker refractory; and Fig. 6 is a plan view of a hearth generally similar to that shown in Fig. 2 but with a different arrangement of the hot plates.

The general construction of the furnace is similar to many of those in present use.

In the drawings I have only shown the upper part of the furnace, 10 representing the sheet metal outer casing with refractory lining 12, 14 representing a drying hearth provided adjacent its periphery with a plurality of annularly spaced plates or insert members 16 with the inner portion 18 constituted wholly of refractory.

The ore to be treated is deposited near the periphery of the drying hearth 14 by any suitable feeding means, as, for example, a suitably controlled feeding hopper 15. The rabbles 20, carried by the arms 22, which are secured to a rotating hollow shaft 24, convey the ore across the hot plates 16 and the refractory portion 18 of the hearth 14 to the center of the hearth, where it is discharged to the first roasting hearth 26 through a suitable gas-tight feed device 28. The dried and preheated ore is progressed across the first roasting hearth 26 by means of a second set of rabbles 22a and then passed through the ports 30 onto the second hearth 32, and so on to the other roasting hearths in the customary manner. The heated gaseous products of the roasting operation exit from the furnace through a suitable gas outlet 34 at the first roasting hearth.

Fig. 3 shows one method of installing hot plates in an existing furnace. Cast iron frames 36 replace certain courses of brick near the periphery of the hearth. The frames are slightly wedge-shaped, open at both ends, and extend through the hearth. The plates 16 are supported on seating surfaces 38 in the tops of the frames 36. For new installations, the frames 36 may be omitted by suitably arranging the brickwork for the reception of the plates 16.

As shown in Figs. 1, 2 and 3, the hot plates 16 are annularly spaced close to the periphery of the hearth so that the wettest feed will first contact with the hottest surfaces. By so doing a large proportion of the water can be eliminated here without possibility of roasting, and the remainder of the water can be driven off while the ore is crossing the refractory portion of the hearth without fear of roasting, because the available heat transfer through the refractory brick is not great enough for roasting.

In some cases it may be desirable to set the row of hot plates in some distance from the periphery so that the ore is preheated to some extent before it is brought on to the hot plates. However, this does not alter the fact that a very substantial part of the drying is carried out by heating the relatively wet ore, followed by heating more slowly to complete the final stages of the drying operation during which stage there would be more danger that roasting would take place to some extent if the heating were continued rapidly.

While I have shown the drying hearth of Figs. 1–3 as provided with eight hot plates 16, it will be understood that the number and positions of the plates may be varied to bring about any desired control of the rate of heat transfer. Instead of arranging the plates in a single annular row, a second and even more rows may be provided. When it is desired to effect the change of heat transfer more gradually this may be accomplished as shown for example in Fig. 6 by providing an outer annular row of hot plates 16 of greater number, say twelve, and an inner concentrically disposed row of plates of lesser number, say six. Other combinations will suggest themselves to a person skilled in the art.

Figure 4:
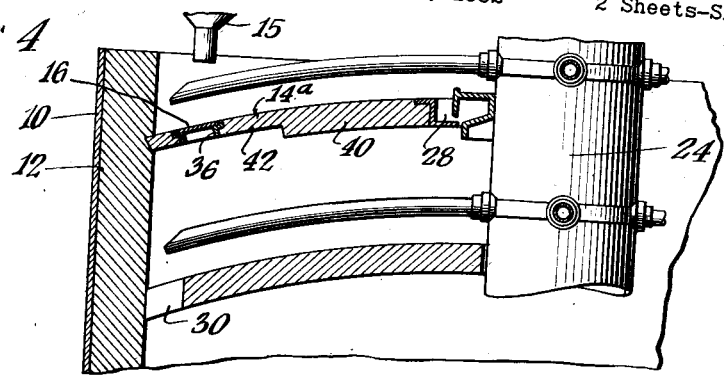
Fig. 4 is a part vertical section of a modified form of drying hearth wherein a differential in the rate of heat transfer through different adjacent portions is effected by the insertion of a plurality of metal plates in a similar manner as shown in Fig. 1 and by further so constructing the refractory portion of the hearth that different annular portions differ in thickness.

The embodiments above described are particularly suitable for application in existing installations although not limited in their usefulness thereto. When the invention is being applied in new installations other embodiments may be conveniently employed as shown by way of example in Figs. 4 and 5. In Fig. 4 the drying hearth 14a is shown as made of a central refractory portion 40 of one thickness and an outer portion 42 of a lesser thickness. Disposed in the outer portion adjacent the periphery thereof are a plurality of hot plates 16 and frames 36.

According to Fig. 5 the hearth 14 is constructed with a relatively thick central refractory portion 40a, an intermediate refractory portion 44 of substantially less thickness than 40a and an outer annular metallic portion 46. The portion 46 may be made of cast iron or other suitable metal and may be made up in sections for convenience in handling and installation. As shown in the drawings, an underhanging lip 48 is provided at the inner edge of the cast iron portion 46 for supporting the adjacent edge of the refractory portion 44. In order to further strengthen the cast iron portion 46 to enable it to adequately support the refractory portion of the hearth radially disposed ribs 50 may be provided at suitable intervals.

I am aware of the fact that all-metal drying operation employing the principles of the present invention. A multiple hearth roaster having a drying hearth set with seven metal plates about twelve inches square at points near the periphery was fed at the rate of 43 tons in twenty-four hours with a high sulphur iron concentrate produced in a flotation operation and of a fineness to pass a 150 mesh sieve. The temperature of the gases in the uppermost roasting chamber and thus contacting with the roasting side of the hearth was in excess of 1000° F. The moisture in the feed was 8.9%. In passing over the drying hearth this moisture was reduced to 1.0%. A roaster of the same size, but not equipped with metal plates, was fed with the same concentrate at the rate of 40 tons per twenty-four hours. The moisture in the feed was 8.7% and this was reduced to 3.7% in passing over the drying hearth.

I am aware of the fact that all-metal drying hearths have heretofore been employed in association with roasting furnaces. However, this has been done only in cases where the temperature of the gases under the drying hearth, either through control of operating conditions or because of the leanness of the ore or for other reasons, has not exceeded 600 or 700° F. The all-metal drying hearth would be unsatisfactory for operations with rich ores and concentrates because, while it dries the ore, it assumes substantially the temperature of the hot furnace gases which are at sufficiently high temperatures to cause roasting to take place to a more or less extent on the drying hearth as soon as the drying of the ore has proceeded to a substantial degree but before the ore has become sufficiently dry to be introduced to the roasting chamber. On the other hand, the all-refractory drying hearth does not transfer sufficient heat from the hot gases to effectively dry the ore before it reaches the working chambers of the furnace. In contradistinction to the prior constructions such as above indicated, my improvements make for more efficient utilization of the heat of the roaster gases and at the same time increase the control and effectiveness of the drying operation with increase in capacity.

While I have described the invention with particular relation to a furnace of the circular multiple hearth type it will be understood that the principles involved have a far wider application and that the invention is not to be deemed as limited to the particular description and drawings or otherwise except as indicated in the appended claims.

Where the apparatus has been described in the claims as a "roasting furnace" or as provided with "roasting or desulphurizing chambers", it is understood that these expressions are not to be limited to their strict technical definitions but should be regarded as inclusive of furnaces used for calcining, chloridizing and similar ore treatment operations. Similarly, the term "ore" is to be understood as including concentrates and similar metalliferous materials.

I claim:

1. In a roasting furnace, a plurality of hearths, one above the other and defining therebetween communicating roasting or desulfurizing chambers, the uppermost of said hearths constituting an ore-drying hearth and provided with an opening through which to feed dried ore to the next succeeding hearth, means associated with said drying hearth for introducing wet ore thereto at a point remote from said opening, said hearth being provided adjacent the point of wet ore introduction with spaced inserts permitting more rapid heat transfer to the ore being fed across said hearth than the hearth portions nearer said feed opening, and means associated with each of said hearths for stirring ore disposed thereon and moving said ore from a point where it is deposited thereon to a feed opening therein communicating with the next succeeding hearth in the series.

2. In a roasting furnace, a plurality of annular hearths, one above the other and defining therebetween communicating roasting or desulfurizing chambers, the uppermost of said hearths constituting an ore-drying hearth and provided with an opening near the center thereof through which to feed dried ore to the next succeeding hearth, means associated with said drying hearth for introducing wet ore thereto near the periphery thereof, said hearth being provided with annularly spaced openings adjacent the periphery, and with inserts normally closing said openings and fitting flush with the hearth surface, said inserts being relatively thin with respect to the thickness of the balance of the hearth and constituting localized zones permitting relatively rapid heat transfer, and means associated with each of said hearths for stirring ore disposed thereon and moving said ore from the point where it is disposed thereon to a feed opening therein communicating with the next succeeding hearth in the series.

3. In a roasting furnace, a plurality of annular refractory hearths, one above the other and defining therebetween communicating roasting or desulfurizing chambers, the uppermost of said hearths constituting an ore-drying hearth and provided with an opening adjacent the center through which to feed dried ore to the next succeeding hearth, means associated with said drying hearth for introducing wet ore thereto near the periphery thereof, said hearth being provided with spaced openings therethrough normally closed by metal plates fitting flush with the hearth surface and constituting localized zones permitting relatively rapid heat transfer, and means associated with each of said hearths for stirring ore disposed thereon and moving said ore from the point where it is deposited to a feed opening therein communicating with the next succeeding hearth in the series.

4. In an ore dryer, an indirectly heated drying hearth, means associated with said drying hearth for feeding wet ore to said hearth, and means associated therewith for stirring ore disposed thereon and moving said ore over the surface of said hearth to a point of discharge, said hearth being provided with spaced portions in the area thereof adjacent the point of feed to said hearth and in the normal path of travel of the ore being fed over the surface of said hearth permitting relatively rapid heat transfer therethrough to ore being fed across said portions, and other portions situated between and separating the said spaced portions and likewise located in the normal path of travel of the ore being fed across the surface of the hearth, said portions being relatively less conductive of heat to said ore.

5. In an ore dryer, an indirectly heated circular drying hearth, and rotary stirring means associated therewith for moving ore radially of said hearth, said hearth being constituted principally of refractory material and provided with annularly spaced metal portions permitting more rapid heat transfer than the refractory portions.

6. In an apparatus for heating ore, a circular hearth adapted to be heated by conduction through the material constituting the same, said hearth being constituted principally of refractory material and having openings disposed in an annular section thereof, metal frames seated in said openings and enlarged adjacent their upper edges to provide seating surfaces, and metal plates fitting in said frames and resting on said seating surfaces.

7. The combination with a metallurgical furnace, having a series of superposed circular working chambers, of a circular drying hearth having a floor constituting also the roof of the uppermost working chamber, said hearth being constructed of refractory material containing metal plates inserted at spaced points near the periphery thereof.

8. In an ore dryer, an indirectly heated circular drying hearth, means associated with said drying hearth for feeding wet ore to said hearth, a rotary stirring means associated therewith for stirring ore disposed thereon and moving said ore over the surface of said hearth to a point of discharge, said hearth being constituted principally of refractory material with an annular portion adjacent the point of feed of ore to said hearth of less thickness than an annular portion adjacent the point of ore discharge, said first mentioned annular portion being provided with a plurality of annularly spaced metal portions permitting more rapid heat transfer than the adjoining refractory portions.

9. In an ore dryer, an indirectly heated circular drying hearth, and means associated therewith for stirring ore disposed thereon and moving said ore over the surface of said hearth to a point of discharge, said hearth being constituted principally of refractory material with concentrically situated annular portions of differing thicknesses and differing abilities to permit of heat transfer, and annularly spaced metal plates disposed in at least one of said portions to permit of more rapid heat transfer therethrough.

10. In an ore dryer, an indirectly heated circular drying hearth, means associated with said drying hearth for feeding the wet ore to said hearth, a rotary stirring means associated therewith for stirring ore disposed thereon and moving said ore over the surface of said hearth to a point of discharge, said hearth being provided with an all-metal annular portion adjacent the point of feed of ore thereto and having its upper surface substantially flush with the rest of the hearth surface, and with an all-refractory annular portion adjacent the point of ore discharge therefrom.

11. In a roasting furnace, a plurality of hearths, one above the other and defining therebetween communicating roasting or desulphurizing chambers, the uppermost of said hearths constituting an ore-drying hearth and provided with an opening through which to feed dried ore to the next succeeding hearth, means associated with said drying hearth for introducing wet ore thereto at a point remote from said opening, said hearth being provided adjacent the point of wet ore introduction with relatively thin spaced inserts fitting flush with the hearth surface and adapted to permit more rapid heat transfer than the balance of the hearth, and means associated with each of said hearths for stirring ore disposed thereon and moving said ore from a point where it is deposited thereon to a feed opening therein communicating with the next succeeding hearth in the series.

12. In a roasting furnace, a plurality of annular hearths, one above the other and defining therebetween communicating roasting or desulphurizing chambers, the uppermost of said hearths constituting an ore drying hearth and provided with an opening near the center thereof through which to feed dried ore to the next succeeding hearth, means associated with said drying hearth for introducing wet ore thereto near the periphery thereof, said hearth being provided with relatively thin spaced openings therethrough, and with inserts normally closing said openings and fitting flush with the hearth surface, said inserts being relatively thin with respect to the thickness of the balance of the hearth and constituting localized zones permitting relatively rapid heat transfer, and means associated with each of said hearths for stirring the ore disposed thereon and moving said ore from the point where it is deposited to a feed opening therein communicating with the next succeeding hearth in the series.

ROY R. BURNS.

to a point of discharge, said hearth being constituted principally of refractory material with concentrically situated annular portions of differing thicknesses and differing abilities to permit of heat transfer, and annularly spaced metal plates disposed in at least one of said portions to permit of more rapid heat transfer therethrough.

10. In an ore dryer, an indirectly heated circular drying hearth, means associated with said drying hearth for feeding the wet ore to said hearth, a rotary stirring means associated therewith for stirring ore disposed thereon and moving said ore over the surface of said hearth to a point of discharge, said hearth being provided with an all-metal annular portion adjacent the point of feed of ore thereto and having its upper surface substantially flush with the rest of the hearth surface, and with an all-refractory annular portion adjacent the point of ore discharge therefrom.

11. In a roasting furnace, a plurality of hearths, one above the other and defining therebetween communicating roasting or desulphurizing chambers, the uppermost of said hearths constituting an ore-drying hearth and provided with an opening through which to feed dried ore to the next succeeding hearth, means associated with said drying hearth for introducing wet ore thereto at a point remote from said opening, said hearth being provided adjacent the point of wet ore introduction with relatively thin spaced inserts fitting flush with the hearth surface and adapted to permit more rapid heat transfer than the balance of the hearth, and means associated with each of said hearths for stirring ore disposed thereon and moving said ore from a point where it is deposited thereon to a feed opening therein communicating with the next succeeding hearth in the series.

12. In a roasting furnace, a plurality of annular hearths, one above the other and defining therebetween communicating roasting or desulphurizing chambers, the uppermost of said hearths constituting an ore drying hearth and provided with an opening near the center thereof through which to feed dried ore to the next succeeding hearth, means associated with said drying hearth for introducing wet ore thereto near the periphery thereof, said hearth being provided with relatively thin spaced openings therethrough, and with inserts normally closing said openings and fitting flush with the hearth surface, said inserts being relatively thin with respect to the thickness of the balance of the hearth and constituting localized zones permitting relatively rapid heat transfer, and means associated with each of said hearths for stirring the ore disposed thereon and moving said ore from the point where it is deposited to a feed opening therein communicating with the next succeeding hearth in the series.

ROY R. BURNS.

CERTIFICATE OF CORRECTION.

Patent No. 1,979,312.

November 6, 1934.

ROY R. BURNS.

It is hereby certified that error appears in the printed specification of the above numbered patent requiring correction as follows: Page 2, line 112, strike out the words "am aw're of the fact that all-metal drying" and insert instead will now describe the results of an actual; and that the said Letters Patent should be read with this correction therein that the same may conform to the record of the case in the Patent Office.

Signed and sealed this 12th day of February, A. D. 1935.

(Seal)

Leslie Frazer
Acting Commissioner of Patents.